Figure 1:
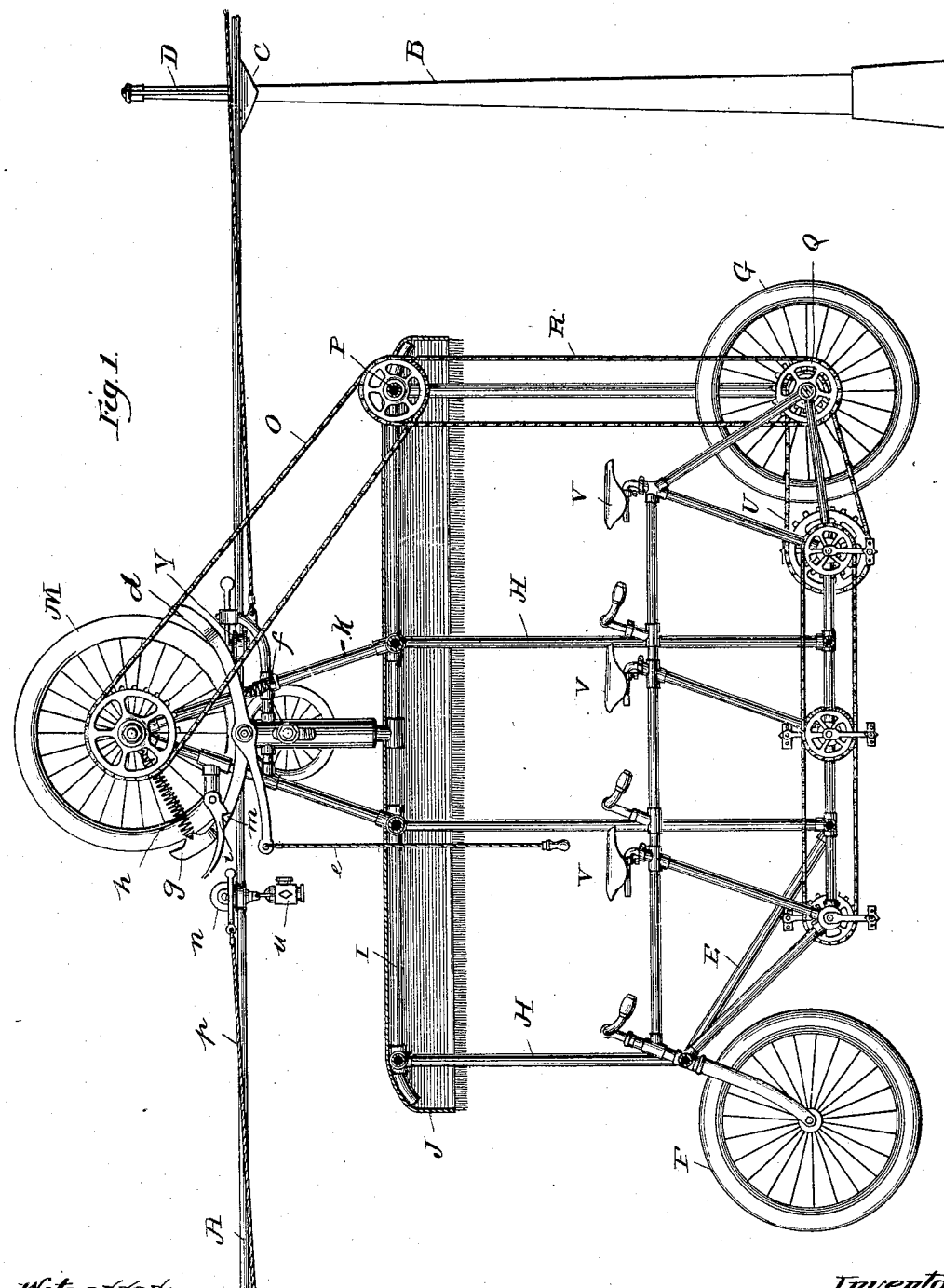

(No Model.) 2 Sheets—Sheet 1.

G. S. FOSTER.
MONOCYCLE.

No. 599,697. Patented Mar. 1, 1898.

Witnesses:
H. B. Hallock
S. S. Williamson

Inventor
George S. Foster
by Geo. H. Holgate
Attorney.

(No Model.) 2 Sheets—Sheet 2.
G. S. FOSTER.
MONOCYCLE.
No. 599,697. Patented Mar. 1, 1898.
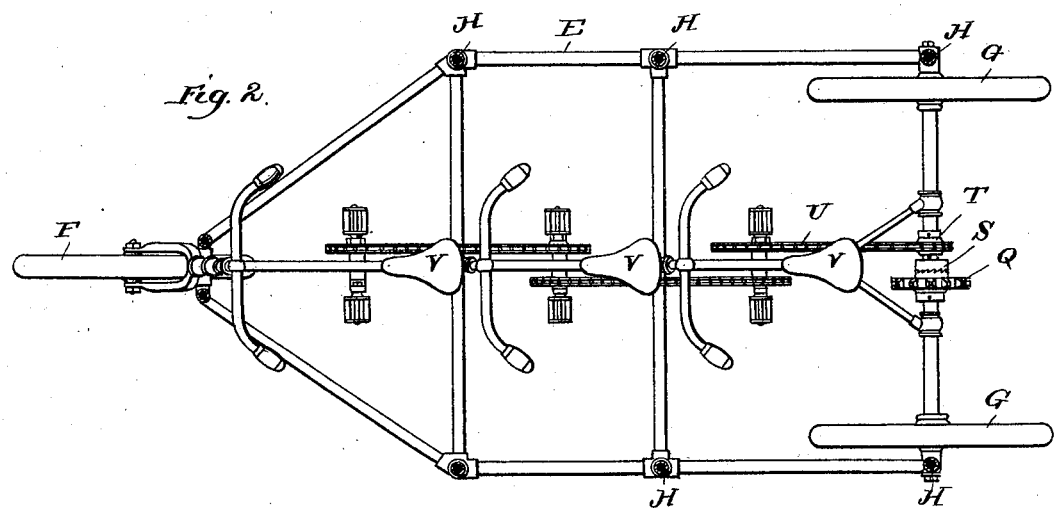
Fig. 2.
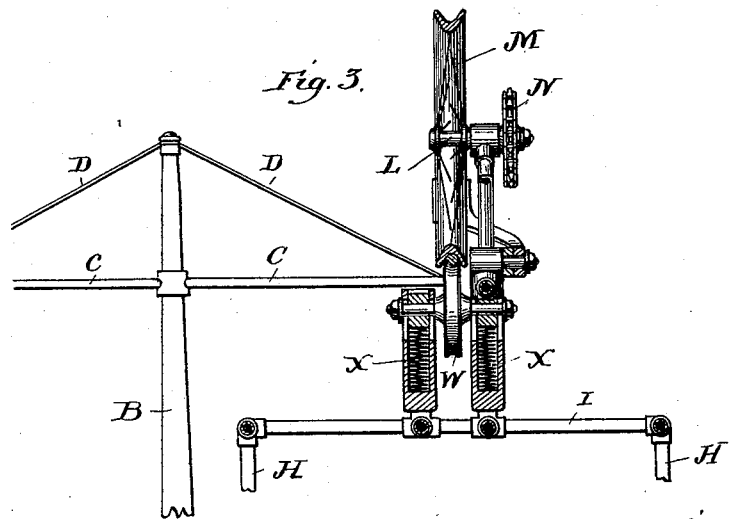
Fig. 3.
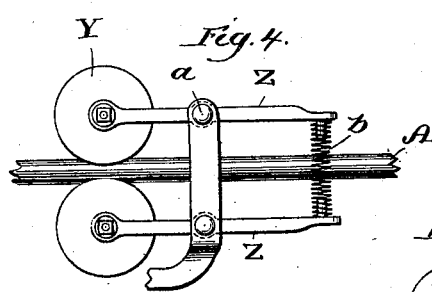
Fig. 4.
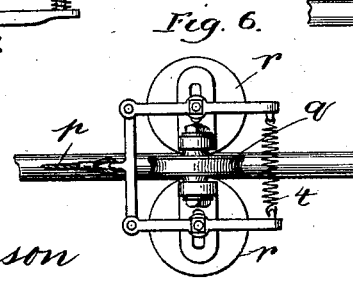
Fig. 5.
Fig. 6.
Witnesses:
H. B. Hallock.
S. S. Williamson.
Inventor:
George S. Foster,
by Geo. H. Holgate
Attorney.
THE NORRIS PETERS CO., PHOTO-LITHO., WASHINGTON, D. C.

UNITED STATES PATENT OFFICE.

GEORGE S. FOSTER, OF BUDA, ILLINOIS.

MONOCYCLE.

SPECIFICATION forming part of Letters Patent No. 599,697, dated March 1, 1898.

Application filed June 26, 1897. Serial No. 642,480. (No model.)

*To all whom it may concern:*

Be it known that I, GEORGE S. FOSTER, a citizen of the United States, residing at Buda, in the county of Bureau and State of Illinois, have invented a certain new and useful Improvement in Monocycles, of which the following is a specification.

My invention relates to a new and useful improvement in monocycles or suspended vehicles, and has for its object to provide a simple and effective apparatus which may be utilized after the manner of a bicycle, but traveling upon an overhead wire, for the transportation of one or more persons, and which may be either propelled by crank mechanism operated by the occupants or by a suitable motor.

With these ends in view this invention consists in the details of construction and combination of elements hereinafter set forth and then specifically designated by the claims.

In order that those skilled in the art to which this invention appertains may understand how to make and use the same, its construction and operation will now be described in detail, referring to the accompanying drawings, forming a part of this specification, in which—

Figure 1 represents my improvement suspended from a cable or wire, the car being in section, so as to illustrate the mechanism therein for propelling the vehicle; Fig. 2, a plan view of the vehicle, the upper portion thereof being sectioned away, so as to more clearly show the driving mechanism; Fig. 3, a vertical section of the upper portion of the device, showing the manner of suspending the same from the line-wire and pole; Fig. 4, a detail illustrating the application of the horizontal guide-wheels; Fig. 5, a detail showing the trailer in elevation for preventing an end-on collision, and Fig. 6 a plan view of this device.

In carrying out my invention as here embodied I string a cable A upon a series of poles B, the latter preferably having cross-arms C, which are properly braced, as indicated at D, the outer ends of these wires terminating in supports adapted to receive the wire, and, as here shown, such a pole is capable of supporting two wires, thus providing a track for the passage of vehicles in both directions.

A tricycle E, provided with a steering-wheel F and two drive-wheels G, is utilized and has projecting upward therefrom the posts H, which serve as a side frame, and the top of these posts are connected by a suitable framework I, over which may be stretched a suitable canopy J to protect the users of the apparatus from sun and rain, and, if desired, side curtains may be provided after the manner of a carriage, so as to completely inclose the vehicle. A triangular suspension-frame K projects upward from the top of the vehicle and has journaled in its upper end the shaft L, upon which is secured a traction-wheel M. This traction-wheel is grooved, so as to travel upon the wire A without liability of sidewise displacement, and upon the other end of the shaft is secured a sprocket-wheel N, over which runs the drive-chain O, the latter also running over the sprocket-wheel upon the shaft P, which shaft carries a similar wheel geared to the sprocket Q by the chain R. The sprocket Q receives its rotation from a clutch S, which is driven by the rear sprocket T, connected to the crank mechanism of the vehicle by the chain U, so that when this clutch is in engagement the actuation of the crank mechanism will cause the traction-wheel M to revolve in the proper direction to give forward progression to the vehicle, as will be readily understood.

In the construction here shown I have provided three seats V in order to accommodate three riders and with the further object of permitting the balancing of the machine when but two riders are mounted or even but a single rider is using the device.

To prevent the possibility of the traction-wheel becoming displaced from the line-wires, I provide a flanged pulley W, adapted to bear against the under side of the wire, immediately beneath the point of contact of the traction-wheel, and this pulley is normally held in contact with the wire by the springs X, which are housed, and act upon the under sides of the boxes in which the axle of the pulley is journaled, as clearly shown in Fig.

3; and the object of this last-named arrangement is to permit the springing upward of this pulley when it is necessary to remove the vehicle from the line-wire.

A further precaution is provided against the displacement of the traction-wheel and also its proper guidance by the grooved guide-pulleys Y, which are journaled upon the arms Z, the latter being pivoted at $a$, and these pulleys, being arranged horizontally, hold the traction-wheel in proper line with the wire, and yet these pulleys are permitted to adapt themselves to curvatures in the line-wire by the action of the springs $b$.

From this description it will be seen that the apparatus may be readily suspended from the line-wire, which should be arranged above the surface of the country over which it is stretched sufficiently to insure the clearance of the wheels F and G, and by one or more riders mounting the proper seats it may be propelled forward at a considerable rate of speed, and when the destination of the rider is reached it may be detached from the line-wire and then used as a surface vehicle after the manner of a tricycle by uncoupling the clutch S, which will cut off the motion from the traction-wheel M and permit the entire power of the rider to be utilized in giving the machine progression upon the surface. A suitable brake $d$ is adapted to bear against the traction-wheel, and a cord $e$ depends therefrom through the top of the vehicle to within easy reach of the rider, in order that the forward progression of the vehicle may be controlled through the means of this brake, the latter being normally held out of contact with the traction-wheel by the spring $f$.

To prevent a collision with a similar vehicle following upon the same track, a brake-shoe $g$ is adapted to bear against the traction-wheel by the action of the spring $h$; but this shoe is normally held out of contact with the traction-wheel by the latch $i$ engaging with the lug $m$ upon said brake, so that until this latch is tripped the traction-wheel is free to revolve without effect from this brake; but when said latch is tripped the brake-shoe $g$ will be drawn inward by its spring, and thereby arrest the forward movement of the vehicle. The tripping of the latch is provided for by the trailer $n$, which is drawn out some distance in the rear of the vehicle by the rope $p$, said trailer consisting of the grooved pulleys $q$ and $r$, the latter being held in firm contact with the line-wire by the coil-spring $t$. It is obvious that should a vehicle following another draw too close to the latter the latch $i$ will ride upward upon the rear portion of the trailer, thus disengaging it from the brake $g$, permitting the latter to be applied, as just set forth, and a signal-lantern $u$ may be suspended from the trailer, which will serve as a warning to the following vehicle of its approach upon a preceding vehicle.

It is to be noted that the spring-actuated pulleys of the trailer will serve to retard its movement upon the wire, so as to prevent it when passing downgrade from running forward out of its proper relative position to the vehicle by which it is drawn.

Slight modifications might be made in the construction here shown without departing from the spirit of my invention.

Having thus fully described my invention, what I claim as new and useful is—

1. In a vehicle of the character described, a tricycle, a frame formed therewith for protecting the riders, a grooved traction-wheel adapted to run upon a line-wire, a safety-wheel journaled beneath the traction-wheel, and mechanism for connecting the pedals of the tricycle with the traction-wheel, as specified.

2. In combination, a tricycle, a frame formed therewith, a canopy carried by said frame, a grooved traction-wheel from which said frame is suspended, a grooved safety-wheel for retaining the traction-wheel in position, guide-wheels journaled horizontally and also adapted to run upon the line-wire, sprocket and chain gearing connected with the traction-wheel, and pedal mechanism by which the sprocket-and-gear mechanism is connected, as shown and described.

3. In combination, a suitable vehicle having surface-wheels, pedal mechanism for operating said wheels, a frame formed with the vehicle, a canopy for partially inclosing the same, a grooved traction-wheel from which the frame is suspended, a sprocket-wheel carried by the traction-wheel, sprockets and chains for communicating motion to the first-named sprocket, pedal mechanism suitably connected with said sprocket-and-chain mechanism, a brake for controlling the forward progression of the vehicle and means for putting the brake under the control of the rider, as specified.

4. In combination with a vehicle of the character described, a trailer adapted to run upon the line-wire and operate the trip whereby the secondary brake may be applied to the traction-wheel for stopping the vehicle, as specified.

5. In combination with a vehicle of the character described, a secondary brake, a spring for actuating the same, a latch for normally holding the brake out of contact with its wheel, and a trailing device carried by the preceding vehicle for tripping said latch, substantially as and for the purpose set forth.

6. In combination with a vehicle of the character described, a trailer consisting of three grooved pulleys adapted to run upon a line-wire, a spring for drawing two of said pulleys in firm contact with the line-wire, whereby said trailer will be prevented from "drifting," and a signal-lantern suspended from the trailer, substantially as and for the purpose set forth.

7. In a device of the character described, a tricycle, a frame formed therewith, a traction-wheel adapted to run on a suitable track, means for preventing the derailment of said wheel and means for driving said traction-wheel, substantially as set forth.

8. In combination, a vehicle having surface wheels, a frame formed with said vehicle, a traction-wheel journaled in said frame and adapted to travel on a track to support the vehicle above ground, and means for driving the surface wheels and traction-wheel substantially as described.

In testimony whereof I have hereunto affixed my signature in the presence of two subscribing witnesses.

GEORGE S. FOSTER.

Witnesses:
S. S. WILLIAMSON,
W. T. AKIN.